United States Patent Office 2,932,642
Patented Apr. 12, 1960

2,932,642

6-OXYGENATED 17α-CARBOXY(ETHYL/VINYL)-3α,5-CYCLO-5α-ANDROSTAN-17-OL LACTONES

Joseph S. Mihina, Skokie, Ill., assignor to G. D. Searle & Co., Chicago, Ill., a corporation of Delaware No Drawing. Application June 8, 1959
Serial No. 818,531

6 Claims. (Cl. 260—239.57)

This invention relates to 6-oxygenated 17α-carboxy (ethyl/vinyl) - 3α,5 - cyclo - 5α - androstan - 17 - ol lactones and processes for the maufacture thereof. More particularly, this invention relates to compounds of the formula

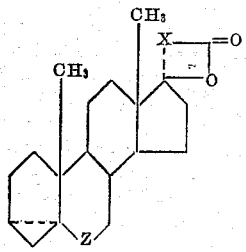

wherein X represents an ethylene or vinylene radical and Z represents a hydroxymethylene (—CHOH—), alkanoyloxymethylene (—CHOCOR—), alkoxymethylene (—CHOR—), or carbonyl (—CO—) radical, R in the parenthetical formulas standing for an alkyl radical. Among the alkanoyloxymethylene and alkoxymethylene radicals represented by Z, those wherein the alkyl constituent (R) is of lower order are preferred. Lower alkyl radicals include methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n-1}$ groupings wherein $n$ is a positive integer amounting to less than 9. Alkanolyoxymethylene and alkoxymethylene radicals of the preferred type are hereinafter referred to as lower alkanoyloxymethylene and lower alkoxymethylene radicals. Those skilled in the art will recognize that when Z in the formula designates such radicals, the compounds comprehended are esters and ethers, respectively, of the alcohols depicted when Z represents a hydroxymethylene radical.

Equivalent to the foregoing lactones for the purposes of this invention are corersponding hydroxy acids and their alkali salts, of the formula

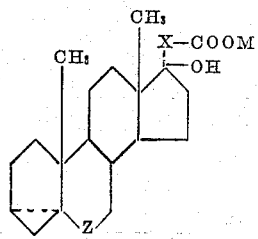

wherein X and Z are defined as before and M represents hydrogen, an alkali metal salt, or the ammonium radical.

The lactones, salts, and hydroxy acids hereinabove set forth are useful by reason of their valuable pharmacological properties. Thus, for example, they are diuretics, in part because of their capacity to block the effect of desoxycorticosterone acetate on urinary sodium and potassium; and they also stimulate the central nervous system. Further, they are characterized by anti-cholesterologenic and anti-ulcerogenic activity.

The compounds of this invention are conveniently prepared from an appropriate lactone

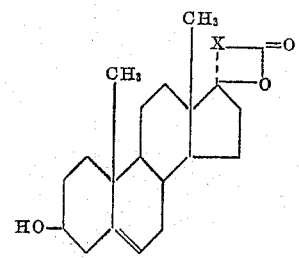

(X representing an ethylene or vinylene radical, ad libitum) by esterifying the 3-hydroxyl with an aromatic sulfonyl chloride (e.g., benzenesulfonyl chloride, p-toluenesulfonyl chloride, etc.) in a tertiary solvent amine (e.g., pyridine, collidine, etc.) and heating the resultant ester with an alkali metal alkanoate (e.g., potassium acetate, sodium propionate, etc.) or comparably mild base in a suitable solvent. Where the solvent is a ketone—such as acetone or butanone—mixed with water, a 6-hydroxy lactone hereof is formed. Anhydrous alkanoic acid or anhydride solvents, on the other hand, give 6-alkanoyloxy lactones, and alcohols give 6-alkoxy lactones, hereof. Oppenauer oxidation of the subject 6-ols affords the corresponding 6-oxo products.

It will be appreciated that the salts of this invention are readily derived from the claimed lactones immediately on contact with aqueous alkali; and the free acids, in turn, are obtained from the salts by a critically brief exposure to a proton source. Prolongation of the exposure time induces lactonization.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *17α - (2 - carboxyvinyl) - 3β - (p - tolylsulfonyloxy)-androst-5-en-17-ol lactone.*—A solution of approximately 10 parts of 17α-(2-carboxyvinyl)androst-5-ene-3β,17β-diol γ-lactone and 8 parts of p-toluenesulfonyl chloride in 40 parts of pyridine is maintained at room temperatures for 24 hours. A needle-like precipitate forms in process. The resultant mixture is dumped into 300 parts of aqueous 15% sodium chloride. Insoluble solids are filtered off and taken up in 500 parts of dichloromethane. The dichloromethane solution is successively washed with water, aqueous 1% sodium bicarbonate, water, 20% hydrochloric acid, and water, then dried over anhydrous sodium sulfate and stripped of solvent by vacuum distillation. The residue, crystallized from a 1:2 mixture of acetone and hexane, melts at approximately 143–144°. A 1% solution in chloroform is characterized by a specific rotation of —9.0°. The product thus obtained is the desired 17α-(2-carboxyvinyl) - 3β - (p - tolylsulfonyloxy) - androst - 5 - en-17-ol lactone.

B. *17α - (2 - carboxyvinyl) - 3α,5 - cyclo - 5α - androsta - 6β,17 - diol γ - lactone.*—To a solution of approximately 9 parts of 17α-(2-carboxyvinyl)-3β-(p-tolylsulfonyloxy)-androst-5-en-17-ol lactone in 355 parts of butanone is added approximately 11 parts of potassium acetate dissolved in 112 parts of water. The resultant solution is heated at the boiling point under reflux for 24 hours, then mixed with 2500 parts of cold water. This mixture is extracted with 1340 parts of dichloromethane, whereupon the dichloromethane extract is washed with water and dried over anhydrous sodium sulfate. Solvent is removed by vacuum distillation; and the residue is chromatographed on silica gel, using benzene and ether as developing solvents. From eluates comprising approximately 6% ether there is obtained, upon evaporation of solvent and crystallization of the residue from ethyl acetate, 17α-(2-carboxyvinyl)-3α,5-cyclo-5α-androsta-6β,-17-diol γ-lactone, melting at 182–185°. A 1% solution in chloroform shows a specific rotation of +113°. The product has the formula

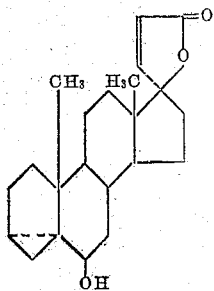

Example 2

*17α - (2 - carboxyvinyl) - 3α,5 - cyclo - 17 - hydroxy-5α - androst - 6 - one lactone.*—To an anhydrous solution of approximately 39 parts of 17α-(2-carboxyvinyl)-3α,5-cyclo-5α-androsta-6β,17-diol γ-lactone in 180 parts of toluene at the boiling point under reflux is added 115 parts of cyclohexanone followed rapidly by 16 parts of aluminum isopropoxide dissolved in 160 parts of toluene. The resultant solution is maintained at the boiling point under reflux for 20 minutes, then chilled and partitioned between a saturated aqueous Rochelle salt solution and toluene. The toluene phase is separated and steam distilled (representatively, for 2 hours) to remove the toluene, cyclohexanone, and cyclohexanone condensation products formed in process, whereupon the residue is extracted with ethyl acetate. The acetate extract is washed with water, dried over anhydrous sodium sulfate, and stripped of solvent by vacuum distillation. The material which remains is chromatographed on silica gel, using benzene and ether as developing solvents. From eluates comprising approximately 4% ether there is obtained, upon evaporation of solvent, 17α-(2-carboxyvinyl)-3α,5-cyclo-17-hydroxy-5α-androst-6-one lactone, of the formula

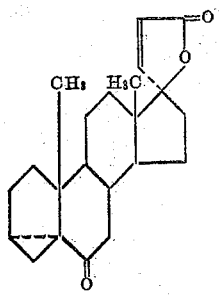

Example 3

A. *17α - (2 - carboxyethyl) - 3β - (p-tolylsulfonyloxy)-androst - 5 - en - 17 - ol lactone.*—A solution of approximately 7 parts of 17α-(2-carboxyethyl)androst-5-ene-3β,17β-diol γ-lactone and 5 parts of p-toluenesulfonyl chloride in 30 parts of pyridine is maintained at room temperatures for 22 hours, during which time precipitation of needles occurs. The precipitated solution is dumped into 300 parts of aqueous 20% sodium chloride; and the resultant mixture, after standing 1 hour, is extracted with 1000 parts of dichloromethane. The dichloromethane extract is successively washed with water, aqueous 1% sodium bicarbonate, water, 20% hydrochloric acid, and water, the water washes in each instance being pursued to substantial neutrality of the wash water. Finally, the dichloromethane extract is dried over anhydrous sodium sulfate and stripped of solvent by distillation. The residue, crystallized from a 1:3 mixture of acetone and hexane, melts at approximately 145.5–146°. A 1% solution in chloroform is characterized by a specific rotation of —78.0°. The product thus obtained is the desired 17α-(2-carboxyethyl)-3β-(p-tolylsulfonyloxy)androst-5-en-17-ol lactone.

B. *17α - (2 - carboxyethyl) - 3α,5 - cyclo - 5α - androsta - 6β,17-diol γ-lactone.*—To a solution of 64 parts of 17α - (2-carboxyethyl) - 3β - (p - tolylsulfonyloxy)androst - 5 - en - 17 - ol lactone in 770 parts of acetone is added approximately 76 parts of potassium acetate in 963 parts of water. The resultant solution is heated at the boiling point under reflux for 29 hours, then concentrated to approximately three-quarters its original volume by vacuum distillation. The concentrate is partitioned between cold water and dichloromethane, following which the dichloromethane phase is separated, dried over anhydrous sodium sulfate, and distilled free of solvent. The residue is chromatographed on silica gel, using benzene and ether as developing solvents. From eluates comprising approximately 8% ether there is obtained, upon evaporation of solvent, an amorphous residue melting at 53–55°. A 1% solution of this material in chloroform has a specific rotation of +7.46°. The product thus obtained is 17α-(2-carboxyethyl)-3α,5-cyclo-5α-androsta-6β,17-diol γ-lactone. It has the formula

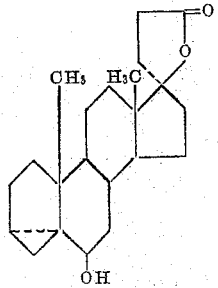

Example 4

*17α - (2-carboxyethyl)-3α,5-cyclo-17-hydroxy - 5α - androst-6-one lactone.*—Using the technique of Example 2, but substituting 39 parts of 17α-(2-carboxyethyl)-3α,5-cyclo-5α-androsta-6β,17-diol γ-lactone for the 39 parts of 17α - (2 - carboxyvinyl)-3α,5-cyclo-5α-androsta-6β,17-diol γ-lactone called for therein, one obtains 17α-(2-carboxyethyl) - 3α,5-cyclo-17-hydroxy-5α-androst-6-one lactone. Recrystallized from 95% alcohol, the product melts at 155–157°. A 1% solution in chloroform is characterized by a specific rotation of +1.5°. The product has the formula

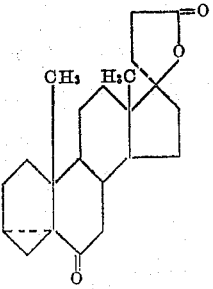

Example 5

*6β - acetoxy - 17α - (2 - carboxyvinyl) - 3α,5 - cyclo-5α-androst-17-ol lactone.*—A solution of 7 parts of 17α-(2-carboxyvinyl)-3β-(p-tolylsulfonyloxy)androst-5-en-17-ol lactone in 300 parts of acetic anhydride, to which is added 20 parts of finely-ground potassium acetate, is stirred at the boiling point under reflux for 36 hours, then dumped into 800 parts of cold brine. The resultant mixture is kept below 40° for 2 hours, then extracted with dichloromethane. The dichloromethane extract is washed with water, aqueous 10% sodium bicarbonate, and finally water again, whereupon it is dried over anhydrous sodium sulfate and stripped of solvent by distillation. Chromatography of the residue on silica gel, using benzene and hexane as developing solvents, affords pure 6β-acetoxy - 17α - (2-carboxyvinyl)-3α,5-cyclo-5α-androst-17-ol lactone, of the formula

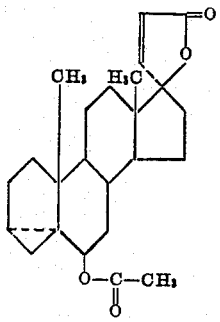

Example 6

*17α - (2 - carboxyethyl) - 3α,5 - cyclo - 6β - methoxy-5α - androst - 17 - ol lactone.*—A solution of 8 parts of 17α - (2 - carboxyethyl) - 3β - (p - tolylsulfonyloxy)androst-5-en-17-ol lactone in 400 parts of methanol, to which is added 12 parts of finely-ground potassium acetate, is stirred at the boiling point under reflux for 24 hours and then mixed with 2000 parts of cold water. The resultant mixture is partitioned between water and dichloromethane. The dichloromethane phase is separated, dried over anhydrous sodium sulfate, and stripped of solvent by vacuum distillation. Chromatography of the residue on silica gel, using benzene and hexane as developing solvents, affords pure 17α-(2-carboxyethyl)-3α,5-cyclo-6β-methoxy-5α-androst-17-ol lactone, of the formula

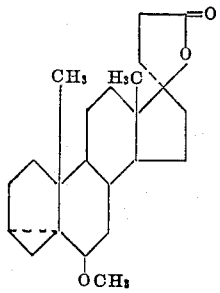

What is claimed is:
1. A compound of the formula

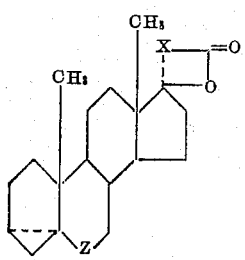

wherein X is selected from the group consisting of ethylene and vinylene radicals and Z is selected from the group consisting of β-hydroxymethylene, β-(lower alkanoyloxy)-methylene, β-(lower alkoxy)methylene, and carbonyl radicals.

2. 17α - (2 - carboxyvinyl) - 3α,5 - cyclo - 5α - androsta-6β,17-diol γ-lactone.

3. 17α - (2 - carboxyethyl) - 3α,5 - cyclo - 5α - androsta-6β,17-diol γ-lactone.

4. 17α - (2 - carboxyethyl) - 3α,5 - cyclo - 17 - hydroxy-5α-androst-6-one lactone.

5. 6β - acetoxy - 17α - (2 - carboxyvinyl) - 3α,5 - cyclo-5α-androst-17-ol lactone.

6. 17α - (2 - carboxyethyl) - 3α,5 - cyclo - 6β - methoxy-5α-androst-17-ol lactone.

References Cited in the file of this patent
UNITED STATES PATENTS
2,705,712    Cella _____ Apr. 5, 1955